(12) United States Patent
Seo

(10) Patent No.: US 8,156,523 B2
(45) Date of Patent: Apr. 10, 2012

(54) SYSTEM AND METHOD OF PROVIDING TELEVISION PROGRAM SHARING SERVICE

(75) Inventor: Beom Joo Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 1742 days.

(21) Appl. No.: 10/115,948

(22) Filed: Apr. 5, 2002

(65) Prior Publication Data

US 2002/0147975 A1 Oct. 10, 2002

(30) Foreign Application Priority Data

Apr. 6, 2001 (KR) .................. 10-2001-0018321

(51) Int. Cl.
*G06F 3/00* (2006.01)

(52) U.S. Cl. ............ 725/39; 725/53; 725/105; 725/131; 725/139; 725/151

(58) Field of Classification Search ...................... 725/39
See application file for complete search history.

(56) References Cited

U.S. PATENT DOCUMENTS

| | | | | | |
|---|---|---|---|---|---|
| 5,630,119 | A | * | 5/1997 | Aristides et al. | 707/1 |
| 5,751,282 | A | * | 5/1998 | Girard et al. | 715/721 |
| 6,101,537 | A | * | 8/2000 | Edelstein et al. | 709/219 |
| 6,189,032 | B1 | * | 2/2001 | Susaki et al. | 709/225 |
| 6,269,394 | B1 | * | 7/2001 | Kenner et al. | 709/217 |
| 6,438,739 | B1 | * | 8/2002 | Yamada | 716/18 |
| 6,774,926 | B1 | * | 8/2004 | Ellis et al. | 348/14.01 |
| 7,089,577 | B1 | * | 8/2006 | Rakib et al. | 725/87 |
| 7,188,356 | B1 | * | 3/2007 | Miura et al. | 725/46 |
| 2002/0007350 | A1 | * | 1/2002 | Yen | 705/52 |
| 2002/0107934 | A1 | * | 8/2002 | Lowery et al. | 709/213 |
| 2002/0133821 | A1 | * | 9/2002 | Shteyn | 725/46 |
| 2002/0154892 | A1 | * | 10/2002 | Hoshen et al. | 386/87 |
| 2003/0093808 | A1 | * | 5/2003 | Eyer et al. | 725/111 |
| 2003/0095791 | A1 | * | 5/2003 | Barton et al. | 386/83 |

FOREIGN PATENT DOCUMENTS

KR 10-2001-0105376 A 11/2001

OTHER PUBLICATIONS

Barkai, David. "An Introduction to Peer-to-Peer Computing". Intel DeveloperUPDATEMagazine. Intel Corporation. Oct. 2000.*
Jeffery, Clinton L. "Proxy-Sharing Proxy Servers". IEEE.1996.*
U.S. Appl. No. 09/568,932, filed May 11, 2000 for Eugene Shteyn and Rudy Roth, Electronic Content Guide Renders Content Resources Transparent, unpublished.*

* cited by examiner

*Primary Examiner* — Kristine Kincaid
*Assistant Examiner* — Chenea Smith
(74) *Attorney, Agent, or Firm* — Birch, Stewart, Kolasch & Birch, LLP

(57) ABSTRACT

Disclosed is a system and method of providing a TV program sharing service that enables sharing of a TV program among EPG-based TV sets and/or set top boxes, and thus enables recording of the already broadcast program whenever a user desires to do so. The system includes a TV client for directly uploading a program stored in its own storage device to another TV client, or for directly downloading a program stored in a storage device of another TV client to itself, and a shared program management center for storing record information of the programs stored in the TV clients in its own database, and enabling a mutual transfer of the programs among the TV clients using its database.

17 Claims, 5 Drawing Sheets

SYSTEM AND METHOD OF PROVIDING TELEVISION PROGRAM SHARING SERVICE

This application claims the benefit of the Korean Application No. P2001-18321 filed on Apr. 6, 2001, which is hereby incorporated by reference.

BACKGROUND OF THE INVENTION

1. Field of the Invention

The present invention relates generally to an electronic program guide (EPG)-based television set and/or set top box having a built-in mass storage device, and more particularly, to a system and method of providing a television (TV) program sharing service that enables sharing of the TV program among the TV sets and/or the set top boxes.

2. Discussion of the Related Art

The electronic program guide (EPG) is for providing diverse broadcasting information such as channel information, edit information, program information, etc., through the TV. The EPG enables a user to instantly inquire about the broadcasting information while the user views the TV and to properly cope with the change of such information. The EPG has already been popularized in the United States, Europe, etc.

The EPG also provides a reserved recording of a program desired by the user according to a program schedule.

However, if any program desired by the user is not in the present program schedule, i.e., if the program has already been broadcast, the EPG can provide no way to record the corresponding program. In this case, a program provider (for example, a broadcasting station) may provide the program by a video on demand (VOD) service, but the program provider should operate a separate server for the VOD operation.

SUMMARY OF THE INVENTION

Accordingly, the present invention is directed to a system and method of providing a TV program sharing service that substantially obviates one or more problems due to limitations and disadvantages of the related art.

An object of the present invention is to provide a system and method of providing a TV program sharing service that enables sharing of a TV program among EPG-based TV sets and/or set top boxes, and thus enables recording of the already broadcast program whenever a user desires to do so.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a system for providing a television (TV) program sharing service includes a TV client for directly uploading a program stored in its own storage device to another TV client, or for directly downloading a program stored in a storage device of another TV client to itself, and a shared program management center for storing record information of the programs stored in the TV clients in its own database, and enabling a mutual transfer of the programs among the TV clients using its database.

In another aspect of the present invention, a method of providing a television (TV) program sharing service includes the steps of a user of a destination TV client requesting a search for a specified program, an electronic program guide (EPG) client engine of the destination TV client searching for EPG information of the program in its own EPG client database, if the EPG information does not exist in the EPG client database, a program sharing service (PSS) application of the destination TV client requesting record information of the program by accessing a shared program management center, a PSS server engine of the shared program management center searching for program record information of another TV client in its own PSS usage database, the PSS server engine selecting a source TV client where the record information of the program exists, and informing the destination TV client of information on the source TV client, the PSS application of the destination TV client requesting a download of the program to the shared program management center, the PSS server engine of the shared program management center informing the request for the program download to the source TV client, and requesting an approval of the source TV client, if the approval of the source TV client is received, the PSS server engine informing the destination TV client of information required for the download, and the PSS application of the destination TV client downloading the program by accessing the source TV client.

Accordingly, the present invention provides the advantages in that if the program that the user desires to record exists in a past broadcasting program, the program stored in a TV set of another user can be directly received and recorded. This function can be provided in the form of a service added to the existing EPG service without the necessity of additional equipment, and thus a new high value can be added to products.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts, and the additional explanation thereof will be omitted.

The program sharing service (PSS) proposed according to the present invention is an application service that can share a TV program among TV sets and/or set top boxes having a mass storage device such as a hard disc drive (HDD).

The program sharing service directly receives and records a program from the TV set or set top box if the program desired by a certain user was in the past broadcasting schedule, but is not in the present broadcasting schedule, and has been recorded in the TV set or set top box of another user.

Accordingly, the users who are subscribers of the program sharing service can share the programs stored in the TV sets or set top boxes of the respective users. Specifically, the user can download the program stored in the TV set or set top box of another user, and can upload the program stored in its own TV set or set top box to another user as well.

At this time, the program sharing service may be provided to the users in combination with the existing EPG, or may be operated in combination with a billing system of digital contents in relation to a copy protection.

Figure 1:
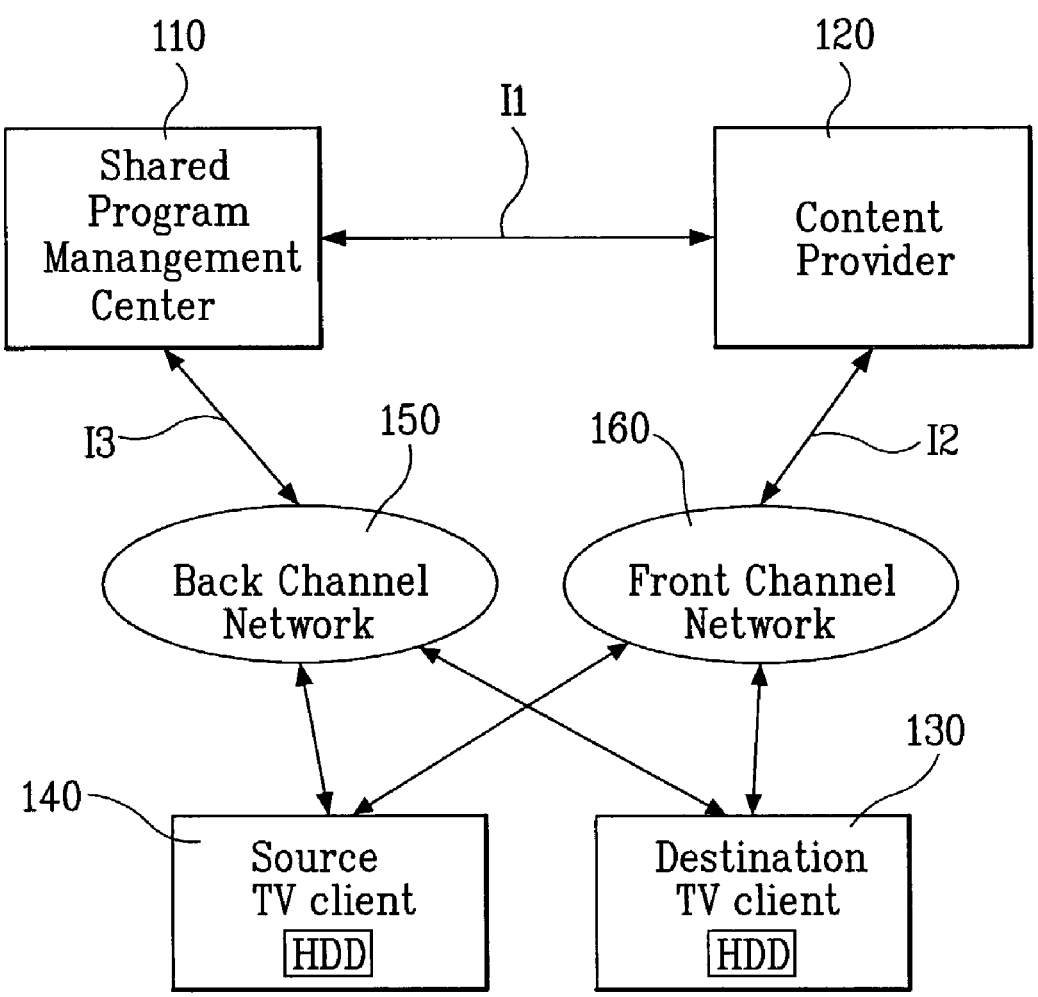
FIG. 1 is a block diagram illustrating the construction of a system for providing a TV program sharing service according to the present invention.

First, referring to FIG. 1, the system for providing a TV program sharing service according to the present invention includes a content provider 120, a shared program management center 110, a plurality of TV clients 130 and 140, a front channel network 160, and a back channel network 150.

The content provider 120 produces and outputs TV programs, and exercises the jurisdiction over copyrights of the programs. For instance, the content provider 120 may be a broadcasting station.

The shared program management center 110 stores recording information of the programs stored in the TV clients 130 and 140 in its own database, and enables mutual transfer of the programs between the TV clients 130 and 140 using the stored recording information. For this, the shared program management center 110 manages broadcasting schedule of the programs in association with the content provider 120, and informs EPG information to the TV clients 130 and 140. Also, the shared program management center 110 receives record information from the TV clients 130 and 140 if the TV clients record the programs. That is, the shared program management center 110 manages the TV clients 130 and 140 to mutually send and receive the programs recorded in their storage devices.

The TV client 130 or 140 is a TV set or set top box having a built-in HDD. In the HDD of the TV client 130 or 140 is stored the TV programs. Accordingly, the TV client 130 or 140 can upload the program stored in its HDD directly to another TV client, or directly download the program stored in the HDD of another TV client.

At this time, the TV client 130 or 140 may be a source TV client 140 for uploading the program, or may be a destination TV client 130 for downloading the program.

Here, the source TV client 140 is the TV client that stores the program desired by the destination TV client 130 in its own HDD, and the destination TV client 130 is the TV client that desires to download the program.

The front channel network 160 is a network environment for transmitting the TV program of the content provider 120, and may be constructed as a land network, satellite network, cable network, etc. Thus, the TV client 130 or 140 can receive the TV program through the front channel network 160.

The back channel network 150 is a network environment located between the shared program management center 110 and the TV clients 130 and 140. Thus, the shared program management center 110 can transmit program supplementary information including the EPG information to the TV clients 130 and 140 through the back channel network 150, and the TV clients 130 and 140 can transmit the program record information to the shared program management center 110 through the back channel network 150. Here, the back channel network 150 may be constructed as a public switched telephone network (PSTN), Internet, cable network, private network, etc.

I1 denotes a signal line for connecting the content provider 120 to the shared program management center 110. The program management center 110 receives the EPG information including the program output information from the content provider 120 through the signal line I1. Also, I2 denotes a signal line for connecting the content provider 120 to the TV clients 130 and 140. The TV clients 130 and 140 receive a broadcasting stream (which may include the EPG information) from the content provider 120 through the signal line I2. Also, I3 denotes a signal line for connecting the shared program management center 110 to the TV clients 130 and 140. The shared program management center 110 and the TV clients 130 and 140 transmit/receive various kinds of information required for the program sharing service through the signal line I3. The TV clients connect to each other to transmit/receive the TV program.

Figure 2:
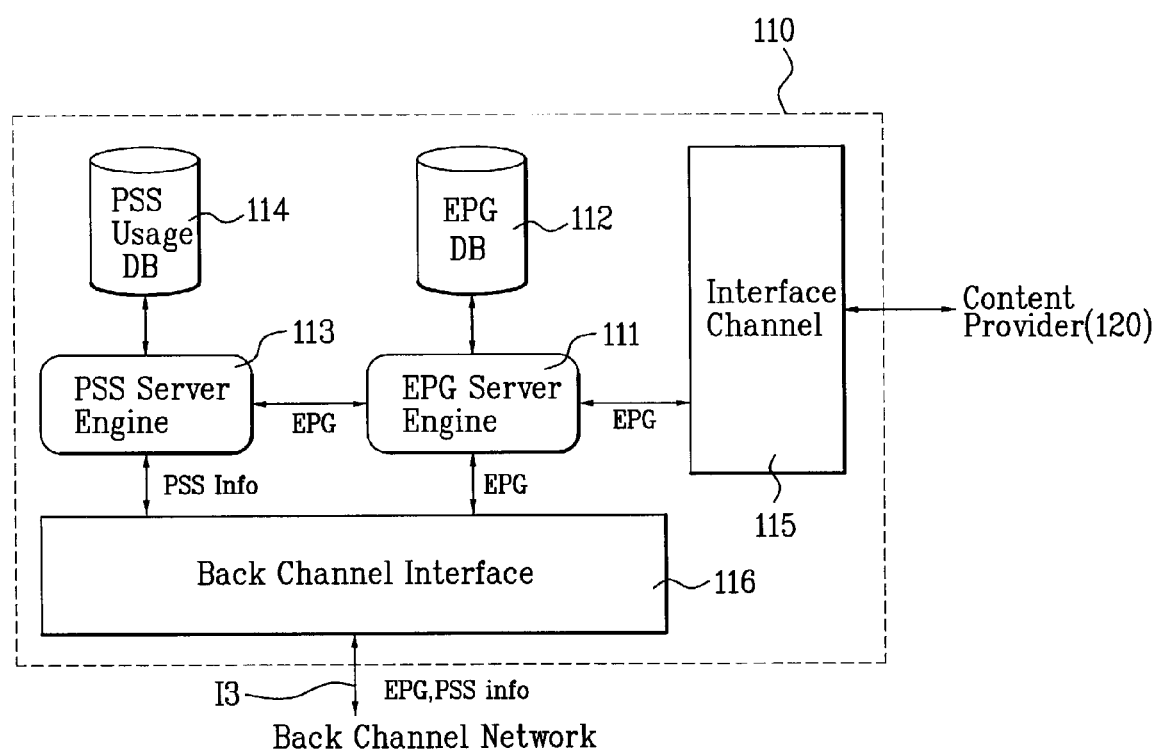
FIG. 2 is a block diagram illustrating the construction of a sharing program management center of the system for providing a TV program sharing service according to the present invention.

As shown in FIG. 2, the shared program management center 110 includes an EPG server engine 111, an EPG database 112, a PSS server engine 113, and a PSS usage database 114.

The EPG server engine 111 receives the EPG information from the content provider. The EPG server engine 111 stores the EPG information in the EPG database 112, and provides the EPG information to the TV clients as well. At this time, in the EPG database 112 are stored both the present broadcasting program schedule and the past broadcasting program schedule.

The PSS server engine 113 receives the program record information and so on from the TV clients, and stores the program record information in the PSS usage database 114. At this time, the PSS usage database 114 is updated in real time by the PSS server engine 113. Also, if the program search is requested from the TV clients, the PSS server engine 113 searches the PSS usage database 114, and provides a result of search to the TV clients.

Here, the PSS usage database 114 may be operated in combination with the EPG database 112.

At this time, the transmission/reception of data between the EPG server engine 111 and the content provider 120 is performed through an interface channel 115, and the transmission/reception of data PSS info and EPG among the EPG server engine 111, the PSS server engine 113, and the TV clients is performed through a back channel interface 116.

Figure 3:
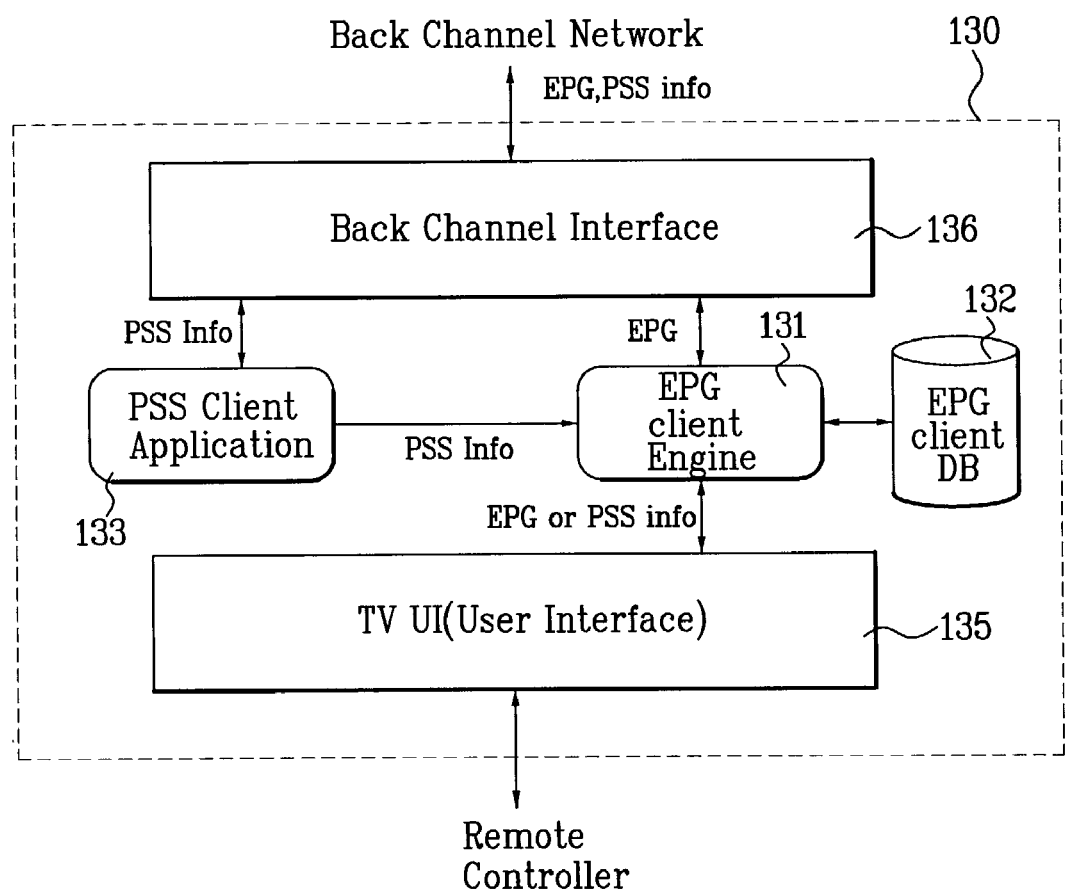
FIG. 3 is a block diagram illustrating the construction of a TV client of the system for providing a TV program sharing service according to the present invention.

As shown in FIG. 3, the TV client 130 includes an EPG client engine 131, an EPG client database 132, and a PSS application 133.

The EPG client engine 131 receives the EPG information from the shared program management center or the content provider, and stores the received EPG information in the EPG client database 132. Also, if the program is requested from the user, the EPG client engine 131 searches the EPG client database 132, and informs the user of the EPG information on the program.

The PSS application 133 is associated with the EPG client engine 131, and if needed, requests a search for the program desired by the user by accessing the shared program management center. That is, if the EPG information of the specified program is not stored in the EPG client database 132, the PSS application 133 requests the program record information of another TV client to the PSS server engine by accessing the shared program management center. Then, the PSS application 133 directly downloads or uploads the program by accessing another TV client.

At this time, the transmission/reception of data EPG and PSS info among the EPG client engine 131, the PSS application 133, and the shared program management center is performed through the back channel interface 136, and the data transmission/reception between the EPG client engine 131 and the user is performed through user interface 135.

Meanwhile, the construction of the TV client 140 not explained is identical to that of the above-described TV client 130.

The TV program sharing service system as constructed above processes a service request/restart, service use, service temporary stop, service stop, service status, etc.

First, the TV client 130 or 140 requests the program sharing service to the shared program management center 110 through the back channel network 150. At this time, the PSS application 133 of the TV client 130 or 140 sends the program record information stored in its own HDD to the shared program management center 110. Then, the PSS server engine 113 of the shared program management center 110 stores the program record information of the TV clients 130 and 140 in the PSS usage database 114. Accordingly, the TV clients 130 and 140 can share the programs stored in their HDDs through the shared program management center 110.

Thereafter, the TV clients 130 and 140, whenever they record the program in their HDD, erase or change the recorded program, inform the shared program management center 110 of the fact.

Now, the method of providing a TV program sharing service according to the present invention will be explained in detail with reference to the accompanying drawings.

First, it is assumed that the TV client 130 is the destination TV client that desires to download the previously broadcast program, and the TV client 140 is the source TV client that stores the program desired by the destination TV client 130 in its own HDD.

Figure 4A:
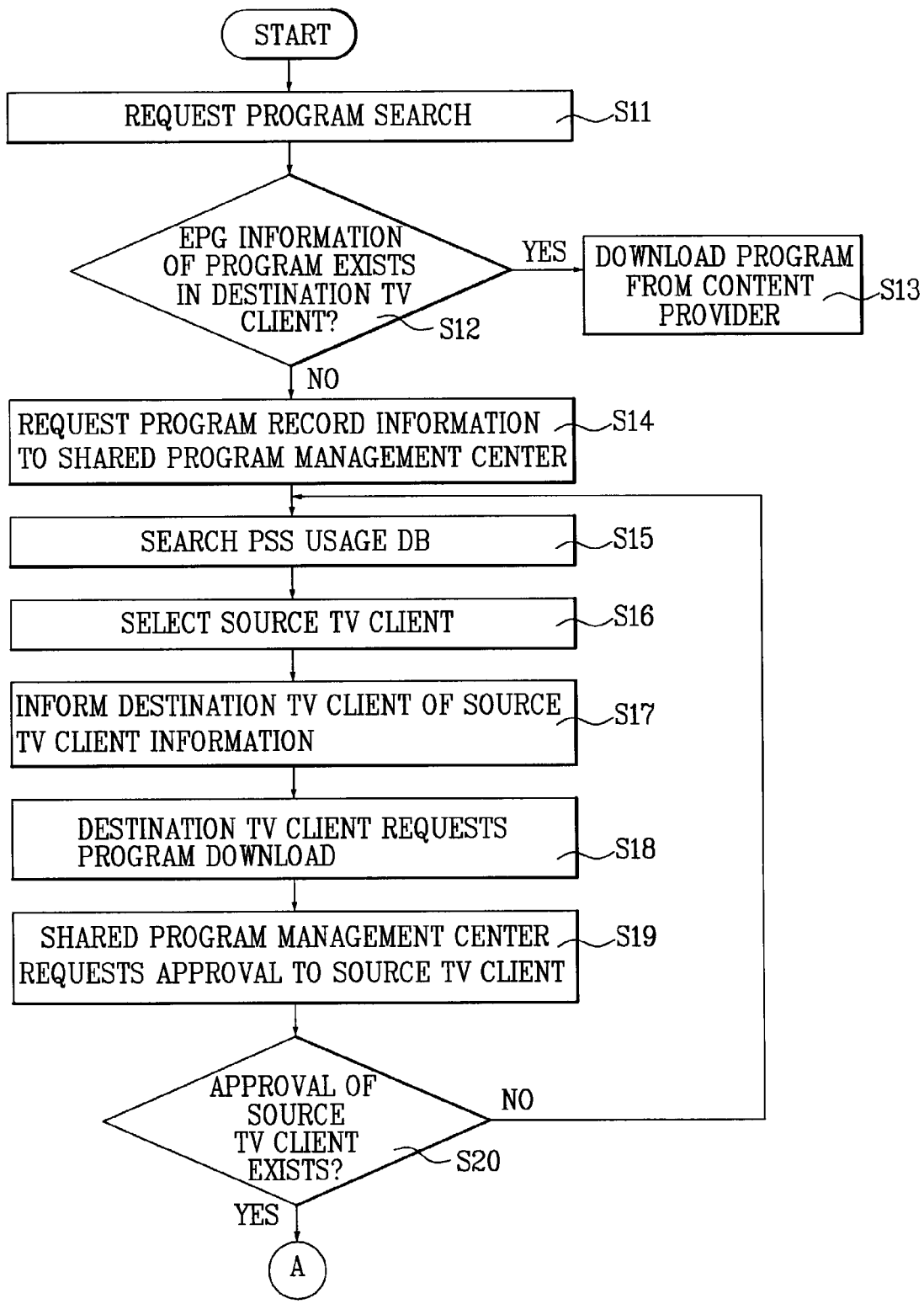
FIGS. 4A and 4B are a flowchart illustrating a method of providing a TV program sharing service according to the present invention.
Figure 4B:
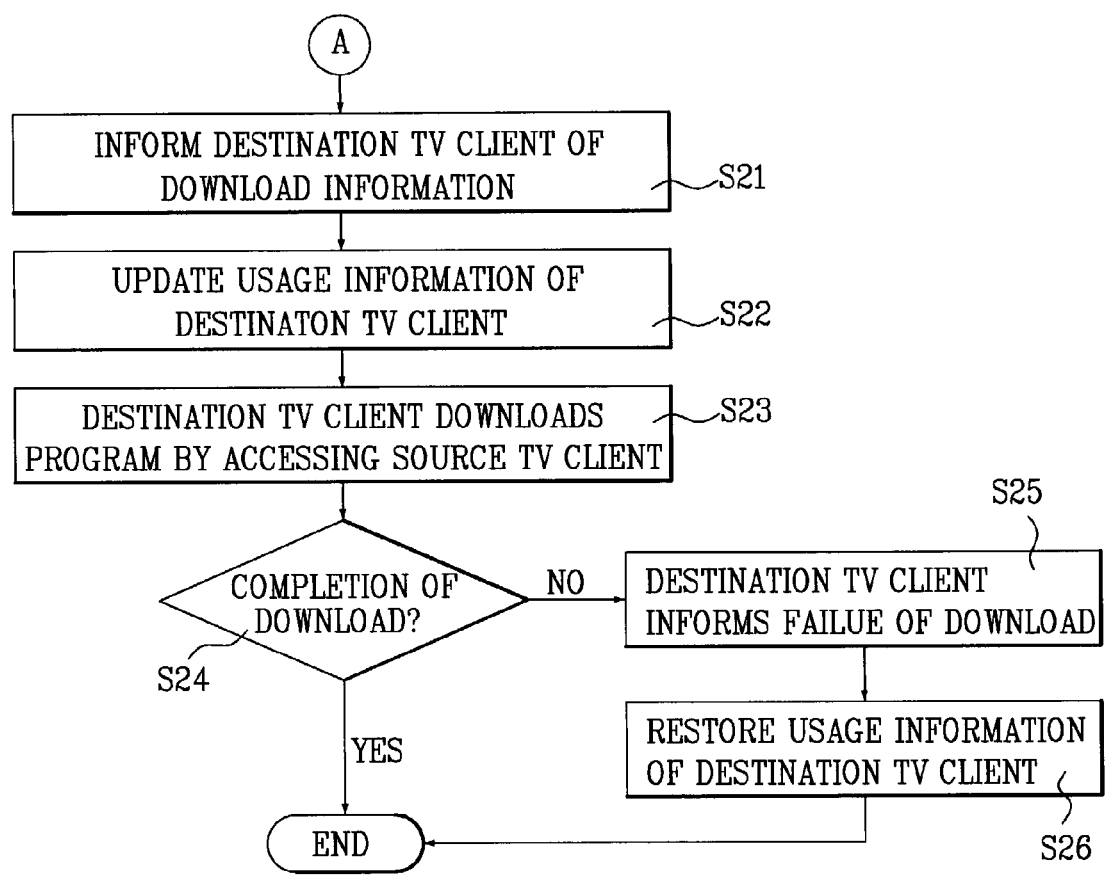

As shown in FIGS. 4A and 4B, the user of the destination TV client 130 requests a search through the user interface 135 to record a specified program (step S11).

In this case, the EPG client engine 131 of the destination TV client 130 searches for the EPG information of the program in its own EPG client database 132 (step S12). AT this time, if the EPG information of the program exists in the EPG client database 132, the EPG client engine 131 receives the program form the content provider 120 based on the EPG information (step S13).

Meanwhile, if the EPF information of the program does not exist in the EPG client database 132, the PSS application 133 of the destination TV client 130 accesses the shared program management center 110 through the back channel network 150, and requests the record information of the program (step S14). In this case, the EPG server engine 111 of the shared program management center 110 searches for the EPG information of the program by searching the EPG database 112. In the EPG database 112 are stored both the present broadcasting program schedule and the past broadcasting program schedule.

If the EPG information of the program exists in the past broadcasting program schedule as a result of search, the PSS server engine 113 of the shared program management center 110 searches for the record information of the program through the PSS usage database 114 (step S15). At this time, in the PSS usage database 114 is stored the program record information of the TV client 130 that requested the program sharing service.

Thereafter, the PSS server engine 113 selects the source TV client 140 that has recorded the program (step S16), and informs the information on the source TV client to the destination TV client 130 through the back channel network 150 (step S17). At this time, the PSS server engine 113 selects the source TV client 140 that is closest to the destination TV client 130 in geographic position or in network bandwidth.

Accordingly, on a screen of the destination TV client 130 is displayed not only the EPG information searched in its EPG client database 132 but also the program information that is stored in the HDD of the source TV client and provided from the shared program management center 110.

Then, the PSS application of the destination TV client 130 requests the download of the program to the shared program management center 110 (step S18).

Then, the PSS server engine 113 of the shared program management center 110 informs the download request of the destination TV client 130 to the source TV client 140, and requests the approval of the download request to the source TV client 140 (step S19). At this time, the source TV client 140 searches for the bandwidth status of its back channel, and informs the shared program management center of a message approving the download request (step S20). Meanwhile, if the approval message is not informed from the source TV client 140, the PSS server engine 113 searches another source TV client through the PSS usage database 114.

If the source TV client 140 approves the download request, the PSS server engine 113 informs the destination TV client 130 of the information required for the download (step S21). At the same time, the PSS server engine 113 updates the usage information of the destination TV client 130 on the PSS usage database 114 (step S22). That is, on the PSS usage database 114 is recorded the program record information of the destination TV client 130. Accordingly, the destination TV client 130 may be the source TV client that can provide the program in future. Meanwhile, it is preferable that the PSS server engine 113 also updates the usage information of the source TV client 140 on the PSS usage database 114.

Then, the PSS application 133 of the destination TV client 130 accesses the source TV client 140 and downloads the program, based on the information that is required for the download and received from the PSS server engine 113 (step S23). At this time, the destination TV client 130 is directly connected to the source TV client 140 through the back channel network 150, and the program is stored in the HDD of the destination TV client 130.

Meanwhile, the program download step (i.e., step S23) may not be completed due to a network failure.

Thus, the PSS application of the destination TV client 130 checks if the program download is completed (step S24).

If the program download fails as a result of checking, the PSS application 133 of the destination TV client 130 informs the failure of the download to the shared program management center 110 (step S25). Continuously, the PSS server engine 113 of the shared program management center 110 restores the usage information of the destination TV client 130 to its original state (step S26). Thus, the program record information of the destination TV client 130 is deleted from the PSS usage database 114.

Meanwhile, the TV client 130 or 140 may desire not to use the program sharing service. In this case, the TV client 130 or 140 can request the shared program management center 110 of the temporary stop or stop of the program sharing service.

If the TV client 130 or 140 requests the shared program management center 110 of the temporary stop of the program sharing service, the PSS server engine 113 of the program management center 110 does not search for the program record information of the TV client 130 or 140 any more. At this time, the program record information of the TV client 130 or 140 is stored in the PSS usage database 114 as it is.

Also, if the TV client 130 or 140 requested the shared program management center 110 of the stop of the program sharing service, the PSS server engine 113 of the program management center 110 completely deletes the program record information of the TV client 130 or 140 from the PSS usage database 114.

Meanwhile, the TV client 130 or 140 may request the shared program management center 110 of its present service status. In this case, the PSS server engine 113 of the shared program management center 110 searches the PSS usage database 114, and informs the TV client of the service status information of the TV client 130 or 140. The service status information includes the frequency of download and upload through the program sharing service. The service status may also include billing information of the download and upload.

As described above, the present invention provides the advantages in that if the program that the user desires to record exists in the past broadcasting schedule, the program stored in the TV set of another user can be directly received and recorded. This function can be provided in the form of a service added to the existing EPG service without the necessity of additional equipment, and thus a new high value can be added to products.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A first broadcast receiver for sharing a television (TV) program among EPG based clients, the first broadcast receiver comprising:
    a storage configured to store electronic program guide (EPG) information and programs requested by the clients according to a user input, client requested program information is stored in the storage;
    a user interface configured to receive a request of a program from a user input; and
    a controller configured to search the EPG information stored in the storage for a requested program and directly receive the requested program from a content provider through a front channel network based on the existence of EPG information of the requested program in the storage that indicates the requested program may be received, and wherein, when the EPG information of the requested program does not exist in the storage this indicates that the requested program has been broadcasted, and the controller is configured to control a request for program record information of the requested program to a shared program management center through a back channel network, receive the program record information that indicates a second broadcast receiver of the EPG clients that stores the requested program from the shared program management center through the back channel network, and receive the requested program from the second broadcast receiver based on the program record information through the back channel network.

2. The first broadcast receiver according to claim 1, wherein the EPG information is received from at least one of the content provider and the shared program management center.

3. The first broadcast receiver according to claim 1, wherein the first broadcast receiver and the second broadcast receiver are a TV set or a set top box having a built-in hard disc drive (HDD).

4. The first broadcast receiver according to claim 1, wherein the controller comprises:
    an electronic program guide (EPG) client engine configured to control to receive the EPG information and store the received EPG information in the storage; and
    a program sharing service (PSS) client application configured to control to request the program record information of the requested program to the shared program management center if the EPG information of the request program does not exist in the storage.

5. The first broadcast receiver according to claim 1, wherein the controller directly transmits an update of recording information about a program to the shared program management center when the program is recorded in the storage of the first broadcast receiver, and deletion information when the program is deleted from the storage of the first broadcast receiver due to an error while receiving the program from the second broadcast receiver.

6. The first broadcast receiver according to claim 1, wherein the controller controls to receive an RF (Radio Frequency) signal including the requested program from the content provider based on the EPG information.

7. The first broadcast receiver according to claim 1, wherein the requested program received from the second broadcast receiver is stored in the storage.

8. A method for sharing a television (TV) program in a first broadcast receiver of EPG based clients, the method comprising:
    receiving a request of a program from a user and searching electronic program guide (EPG) information of the requested program in a storage of the first broadcast receiver to determine whether EPG information of the requested program exists in the storage;
    directly receiving via the first broadcast receiver the requested program from a content provider through a front channel network based on the searched EPG information without transmitting a request to a shared program management center when the EPG information exists in the storage;
    requesting program record information of the requested program to the shared program management center through a back channel network when the EPG information does not exist in the storage, and receiving via the first broadcast receiver the program record information from the shared program management center through the back channel network; and
    receiving in the broadcast receiver the requested program from a second EPG client broadcast receiver through the back channel network based on the client requested program information, wherein the program record information includes information used for receiving the requested program stored in the second broadcast receiver.

9. The method according to claim 8, wherein the EPG information is received from at least one of the content provider and the shared program management center.

10. The method according to claim 8, wherein the first broadcast receiver and the second broadcast receiver are a TV set or a set top box having a built-in hard disc drive (HDD).

11. The method according to claim 8, further comprising:
directly transmitting an update of recording information about a program to the shared program management center when the program is recorded in the storage of the first broadcast receiver, and deletion information when the program is deleted from the storage of the first broadcast receiver due to an error while receiving the program from the second broadcast receiver.

12. The method according to claim 8, wherein the receiving the requested program from the content provider comprises receiving an RF (Radio Frequency) signal including the requested program from the content provider based on the searched EPG information.

13. The method according to claim 8, further comprising:
recording the requested program received from the second broadcast receiver in the storage.

14. A first broadcast receiver for sharing a television (TV) program among EPG based clients, the first broadcast receiver comprising:
a storage configured to store electronic program guide (EPG) information and programs requested by the clients according to a user input, wherein client requested program information is stored in the storage in a digital video format;
a user interface configured to receive a request of a program from a user input; and
a controller configured to search the EPG information stored in the storage for a requested program to directly receive the requested program from a content provider through a front channel network based on the existence of EPG information of the requested program in the storage and wherein when the EPG information of the requested program does not exist in the storage this indicates that the requested program has been broadcasted, and the controller is configured to control a request for program record information of the requested program to the shared program management center through a back channel network, receive the program record information that indicates a second broadcast receiver of the EPG clients that stores the requested program from the shared program management center through the back channel network, and receive the requested program through the back channel network from the second broadcast receiver based on the program record information, and
wherein the controller is configured to directly transmit an update of recording information about a program to the shared program management center when the program is recorded in the storage of the first broadcast receiver, and deletion information when the program is deleted from the storage of the first broadcast receiver due to an error while receiving the program from the second broadcast receiver.

15. The first broadcast receiver according to claim 14, wherein the requested program received from the second broadcast receiver is stored in the storage.

16. A method for sharing a television (TV) program in a first broadcast receiver of EPG based clients, the method comprising:
receiving a request of a program from a user and searching electronic program guide (EPG) information of the requested program in a storage of the first broadcast receiver to determine whether EPG information of the requested program exists in the storage;
directly receiving via the first broadcast receiver the requested program through a front channel network from a content provider based on searched EPG information without transmitting a request to a shared program management center when the EPG information exists in the storage;
requesting program record information of the requested program through a back channel network to the shared program management center when the EPG information does not exist in the storage, and receiving via the first broadcast receiver the program record information from the shared program management center through the back channel network;
receiving in the first, broadcast receiver the requested program from a second broadcast receiver through the back channel network based on the client requested program information, wherein the client requested program information includes information used for receiving the requested program stored in the second broadcast receiver; and
directly transmitting an update of EPG client recording information about a program to the shared program management center through the back channel network when the program is recorded in the storage of the first broadcast receiver, and deletion information when the program is deleted from the storage of the first broadcast receiver due to an error while receiving the program from the second broadcast receiver.

17. The method according to claim 16, further comprising:
recording the requested program received from the second broadcast receiver in the storage.

* * * * *